US011867100B2

(12) United States Patent
Fisher

(10) Patent No.: US 11,867,100 B2
(45) Date of Patent: Jan. 9, 2024

(54) FLUID EXTRACTION SYSTEM FOR VEHICLES

(71) Applicant: Fisher and Associates, Inc., Calhoun, GA (US)

(72) Inventor: James C. Fisher, Calhoun, GA (US)

(73) Assignee: Fisher and Associates, Inc., Calhoun, GA (US)

( * ) Notice: Subject to any disclaimer, the term of this patent is extended or adjusted under 35 U.S.C. 154(b) by 0 days.

(21) Appl. No.: 17/901,452

(22) Filed: Sep. 1, 2022

(65) Prior Publication Data

US 2023/0070574 A1 Mar. 9, 2023

Related U.S. Application Data

(60) Provisional application No. 63/239,638, filed on Sep. 1, 2021.

(51) Int. Cl.
*F01M 11/04* (2006.01)
*B60S 5/00* (2006.01)

(52) U.S. Cl.
CPC .............. *F01M 11/045* (2013.01); *B60S 5/00* (2013.01)

(58) Field of Classification Search
CPC ............................................ F01M 11/045184
See application file for complete search history.

(56) References Cited

U.S. PATENT DOCUMENTS

| 3,867,999 A | 2/1975 | Cox | |
|---|---|---|---|
| 5,476,154 A | 12/1995 | Sage | |
| 5,554,278 A * | 9/1996 | Henderson | F02M 25/00 210/171 |
| 6,003,635 A * | 12/1999 | Bantz | F01M 11/045 184/58 |
| 6,062,275 A * | 5/2000 | Rome | F16H 57/0408 141/192 |
| 6,302,167 B1 * | 10/2001 | Hollub | B60T 17/221 141/98 |
| 2003/0019690 A1 * | 1/2003 | Chandler | F01M 11/045 184/1.5 |
| 2007/0023088 A1 * | 2/2007 | Benson | F01C 13/04 137/565.11 |

FOREIGN PATENT DOCUMENTS

GB 2042883 A * 10/1980 ........... F01M 11/045

OTHER PUBLICATIONS

FR2597850A1 and translation (Year: 2023).*

(Continued)

*Primary Examiner* — Timothy P. Kelly
(74) *Attorney, Agent, or Firm* — Chambliss, Bahner & Stophel, P.C.; Stephen D. Adams

(57) ABSTRACT

A system for removing fluids, such as engine oil, from internal combustion powered vehicles is disclosed. The system includes a pump, an extraction line that connected between the pump and the oil pan drain (or other similar fluid receptacle drain) of the vehicle, a controller, a fluid storage container and a discharge line that is connected between the pump and the storage container. The fluid extracted is automatically transferred to a pressurized intermediate storage container and subsequently transferred to a non-pressurized final storage container.

1 Claim, 4 Drawing Sheets

(56) References Cited

OTHER PUBLICATIONS

DE19617097A1 and translation (Year: 2023).*
FR2732820A1 and translation (Year: 2023).*
DE4423917A1 and translation (Year: 2023).*
Runnoe, Adam, The Purpose and Benefits of an Air/Oil Separator, MA Performance Blog, https://www.maperformance.com/blogs/tech/the-purpose-and-benefits-of-an-air-oil-separator, Accessed Sep. 1, 2022.

* cited by examiner

FLUID EXTRACTION SYSTEM FOR VEHICLES

CROSS-REFERENCE TO RELATED APPLICATIONS

This application claims the benefit of U.S. Provisional Application No. 63/239,638 filed Sep. 1, 2021, and entitled FLUID EXTRACTION SYSTEM FOR VEHICLES, which is incorporated herein by reference in its entirety.

FIELD

The present invention relates generally to a fluid extraction system for internal combustion powered vehicles such as automobiles and trucks. More particularly, the invention relates to a system for extracting fluids such as engine oil from one or more vehicles and for automatically transporting the fluids extracted to a storage container.

BACKGROUND

America's trucking industry is the lifeblood of the nation's economy. In fact, nearly every product sold in the United States is put on a truck at some point. As a result, the trucking industry hauls the vast majority of all freight transported in the United States, comprising more than 11 billion tons. There are more than 36 million trucks, including tractors that are adapted to be connected to freight trailers for highway use, which are registered and used for business purposes (excluding government and farm) in the United States. These trucks travel more than 300 billion miles per year in carrying freight within the United States.

These trucks are expensive items of equipment, and they require regular maintenance to keep them in safe operating condition. One item of maintenance that is frequently needed is engine oil changes. The conventional method for changing the engine oil is to first drive the truck over an open service bay or elevate the truck using a lift. An oil pan drain plug is then manually removed and the oil is allowed to drain out of the oil pan under the influence of gravity. This can take up to thirty minutes, depending on the quantity of oil in the fluid circuit, the viscosity and temperature of the oil and the diameter of the oil pan drain. It is estimated that this process will remove at most about 95% of the amount of oil in the vehicle's fluid circuit. When oil stops dripping out of the oil pan drain, the drain plug is replaced, and new oil is added through the oil fill opening.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by methods and a fluid extraction system including a pump, an extraction line that is adapted to be operatively connected between the pump and the oil pan drain (or similar fluid receptacle drain) of a vehicle, a controller, a fluid storage container and a discharge line that is operatively connected between the pump and the storage container. In a preferred embodiment, the fluid extracted is automatically transferred to a pressurized intermediate storage container and subsequently to a non-pressurized final storage container.

In order to facilitate an understanding of the invention, the preferred embodiment of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter described and claimed herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

Among the advantages of the invention is that it provides a system to safely and quickly remove essentially all of the fluid from a fluid circuit. Furthermore, the invention automatically transfers the fluid removed to an intermediate storage container. In a preferred embodiment of the invention, the system is adapted to extract fluids from a plurality of vehicles either sequentially or simultaneously, to monitor the amount of fluid in the intermediate storage container and to transfer the fluid in the intermediate storage container to a final storage container of larger capacity. Other advantages and features of this invention will become apparent from an examination of the drawings and the ensuing description.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
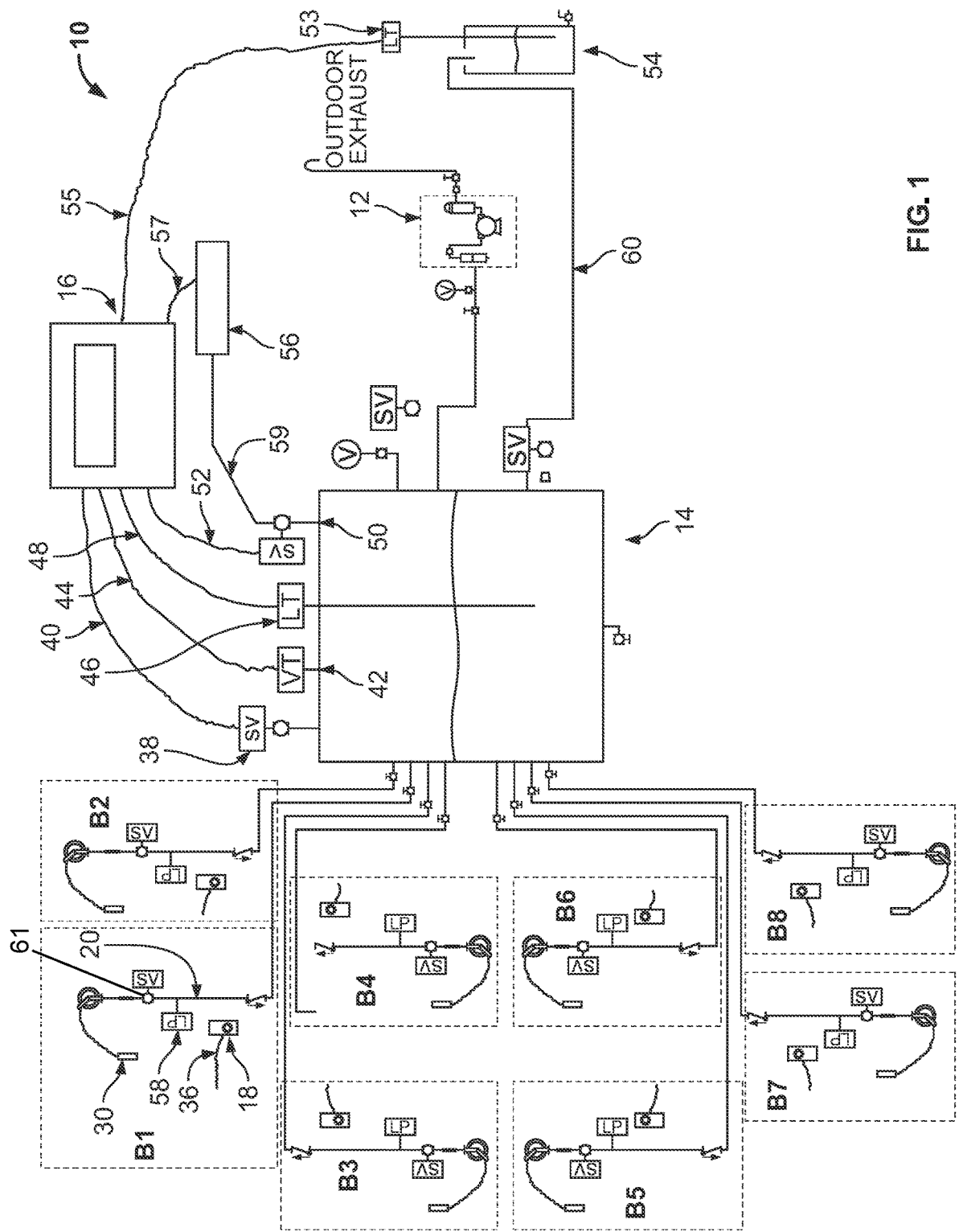
FIG. 1 depicts a schematic view of a preferred embodiment of the invention.

This description of the preferred embodiment of the invention is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness.

As shown in FIG. 1, preferred fluid extraction system 10 includes pump 12, preferably a single stage rotary vane vacuum pump, and intermediate storage container 14. System 10 is adapted to operate in eight vehicle service bays, B1, B2, B3, B4, B5, B6, B7 and B8. Of course, the system is adaptable to operation in only one, or in any convenient number of vehicle service bays. The system is also adaptable to operate multiple bays both sequentially or simultaneously.

Also shown in FIG. 1 is controller 16. The controller may comprise a programmable logic controller such as a Siemens S7-1214 PLC. It may include components for controlling the system based on input from an operator of the system and on sensed, measured or other known operational parameters. Controller 16 may include or be associated with a memory component, a data input component such as a joystick, a touch screen, a keyboard and/or a plurality of actuating buttons, a display screen, a secondary storage device, a processor and other components for running an application. Various circuits may be associated with and operatively connected to controller 16, such as for example, power supply circuitry. Numerous commercially available processing devices can be configured to perform the functions of controller 16. It should be appreciated that controller 16 could readily be embodied in a general purpose computer or machine microprocessor capable of controlling the numerous functions of system 10.

Figure 2:
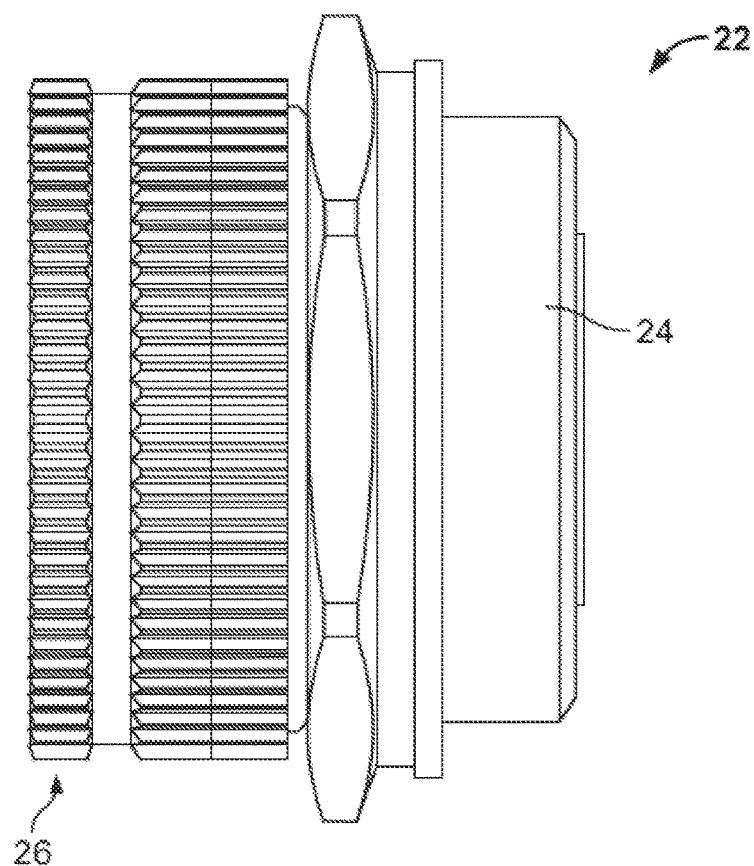
FIG. 2 is a side view of a first component of a preferred connector adapted to be inserted into an oil pan drain of a vehicle.
Figure 3:
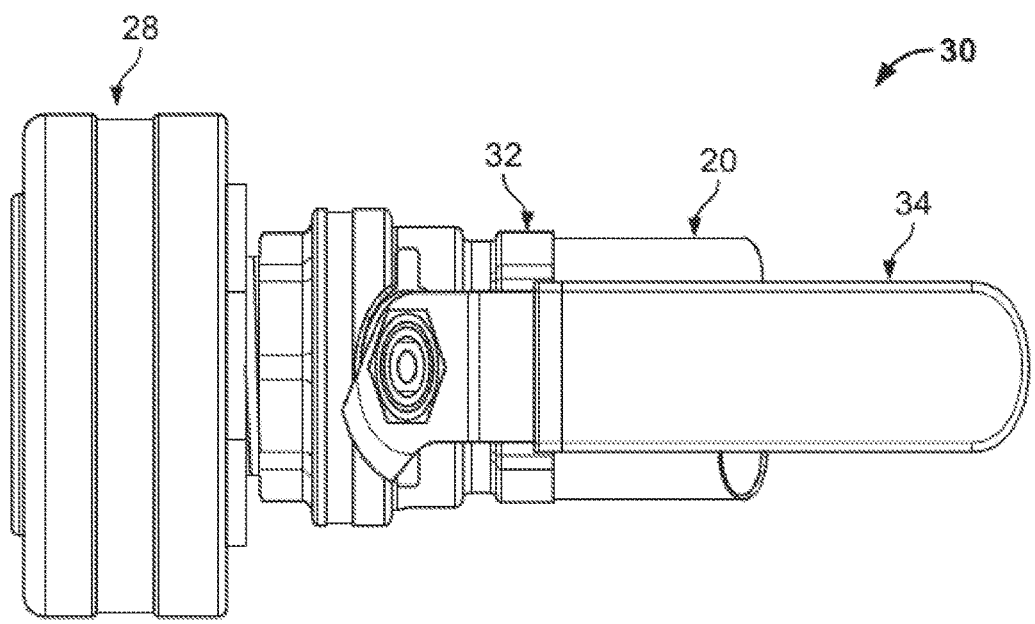
FIG. 3 is a side view of a second component of a preferred connector that is adapted to be attached to a fluid extraction line and is adapted to mate with the first component shown in FIG. 2.

Referring now to service bay B1, as representative of all of the service bays shown in FIG. 1, system 10 includes operating switch 18 which is operatively connected to controller 16, and fluid extraction line 20 which is operatively connected to intermediate storage container 14. In certain preferred embodiments, fluid extraction line 20 is a clear material allowing for visual inspection of waste fluid and a visual indicator of the absence of oil residue in the interior of the fluid extraction line 20. Referring now to FIG. 2, first component 22 of a preferred connector includes threaded end 24 that is adapted to be inserted into the oil pan drain of a vehicle in place of a conventional threaded drain plug. First component 22 also includes receiver 26 that is adapted to receive quick-connect coupling 28 of second component 30 of the preferred connector (shown in FIG. 3). Second component 30 is operatively attached at line end 32 to fluid extraction line 20. Second component 30 also includes valve component 34 that may be employed to open or close the fluid communication between second component 30 and intermediate storage container 14. The preferred connector thus provides a quick-connect, secure, leak-proof fluid connection between the oil pan of a vehicle and intermediate storage container 14.

Controller 16 is operatively attached to operating switch 18 of service bay B1 by communication line 36. Controller 16 is also operatively attached to the operating switches of each of the other service bays, in a similar manner. In addition, controller 16 is operatively attached to valve 38 of intermediate storage container 14 by communication line 40, and to vacuum sensor/transmitter 42 of intermediate storage container 14 by communication line 44. Controller 16 is also operatively attached to level sensor/transmitter 46 by communication line 48 and to valve 50 by communication line 52. Controller 16 is also operatively connected to level sensor/transmitter 53 of final storage container 54 by communication line 55. Controller 16 is also operatively connected to compressed air source 56 by communication line 57. In other embodiments of the invention, communication lines 36, 40, 44, 48 52, 55 and 57 may be replaced by a wireless communication system. Controller 16 is also operatively connected, in a similar manner (not shown), to liquid presence detector 58 and valve 61 in fluid extraction line 20. Compressed air source 56 is operatively attached to intermediate storage container 14 by air line 59, and final storage container 54 is operatively attached to intermediate storage container 14 by fluid line 60.

To begin operation of preferred fluid extraction system 10, an operator powers up controller 16, whereupon pump 12 will run to satisfy a predetermined vacuum set point, such as 26 inches Hg. This predetermined set point is adjustable based upon operating conditions such as suction height, pipe friction losses, oil type and oil temperature. When the predetermined vacuum set point is met, pump 12 stops and system 10 enters a "stand-by" mode. When this has been accomplished, the operator will position a truck in a vehicle service bay such as service bay B1 and remove the oil fill cap on the truck engine. Then, quick-connect coupling 28 of second component 30 of the preferred connector is inserted into receiver 26 of first component 22. Valve 34 is opened, and switch 18 is actuated to begin the fluid extraction process. Controller 16 opens valve 61 in the system fluid circuit, allowing vacuum to reach the oil pan of the truck, as communicated to the controller by vacuum sensor/transmitter 42. When liquid presence detector 58 in fluid extraction line 20 communicates to controller 16 that fluid is no longer flowing in fluid extraction line 20, controller 16 will close valve 61. The operator may then close valve 34 and remove quick-connect coupling 28 of second component 30 of the preferred connector from receiver 26 of first component 22. The operator may then add oil to the vehicle's engine and replace the oil fill cap.

In certain embodiments, the controller 16 includes logic integrating a timer associated with the suction cycle. The timer, upon receiving a signal from liquid presence detector 58 indicating a lack of liquid, will initiate and run for a predetermined period of time before closing valve 61 and removing any vacuum pressure from the fluid extraction line 20. This controlled run time allows for a complete evacuation of the fluid from the fluid reservoir, i.e., the oil from the oil pan. Additionally, this extended run time allows for removal of any oil residue from the fluid extraction line 20. Residual oil must be contained as it can create workplace and environmental hazards.

In certain other embodiments, the fluid extraction line 20 includes a small reservoir capable of holding an amount of oil suitable for oil analysis. This reservoir is typically sized from 1 to 5 ounces but can be larger or smaller depending on the needs of the analyzer. Additionally, in certain embodiments, the fluid extraction line 20 may contain an oil analysis element in communication with controller 16. The oil analysis element would provide the controller 16 with measurements of certain properties of the oil, indicating the condition of both the oil and the engine the oil is being removed from. These properties can include levels of metals, silicon, and additives in the oil, viscosity of the oil, presence of solids in the oil, and the flashpoint of the oil.

Preferably, the controller can include a database for tracking, over time, the vehicle maintenance history and catalogued oil analyses. This system can utilize the engine serial number, vehicle identification number, a unique indicator generated by the controller, or any other suitable identifying indicia.

Preferably, intermediate storage container 14 has a fluid capacity of 200-300 gallons. When level sensor/transmitter 46 of intermediate storage container 14 communicates to controller 16 that a quantity of oil sufficient to fill intermediate storage container 14 to a predetermined "full" set point, such as for example, 75% of the container volume, has been received in the intermediate storage container, the controller will open valve 38 to allow atmospheric pressure to enter the intermediate storage container, and then the controller will close valve 38. Controller 16 will also actuate compressed air source 56 and open valve 50 to add compressed air to intermediate storage container 14 via air line 59, thereby causing oil in the intermediate storage container to be conveyed to final storage container 54 through fluid line 60. When level sensor/transmitter 46 communicates to controller 16 that the intermediate storage container has been emptied, controller 16 will return system 10 to "standby" mode. In certain embodiments, an additional pump is included connected to fluid line 60 for conveying waste oil from intermediate storage container 14 to final storage container 54.

Figure 4:
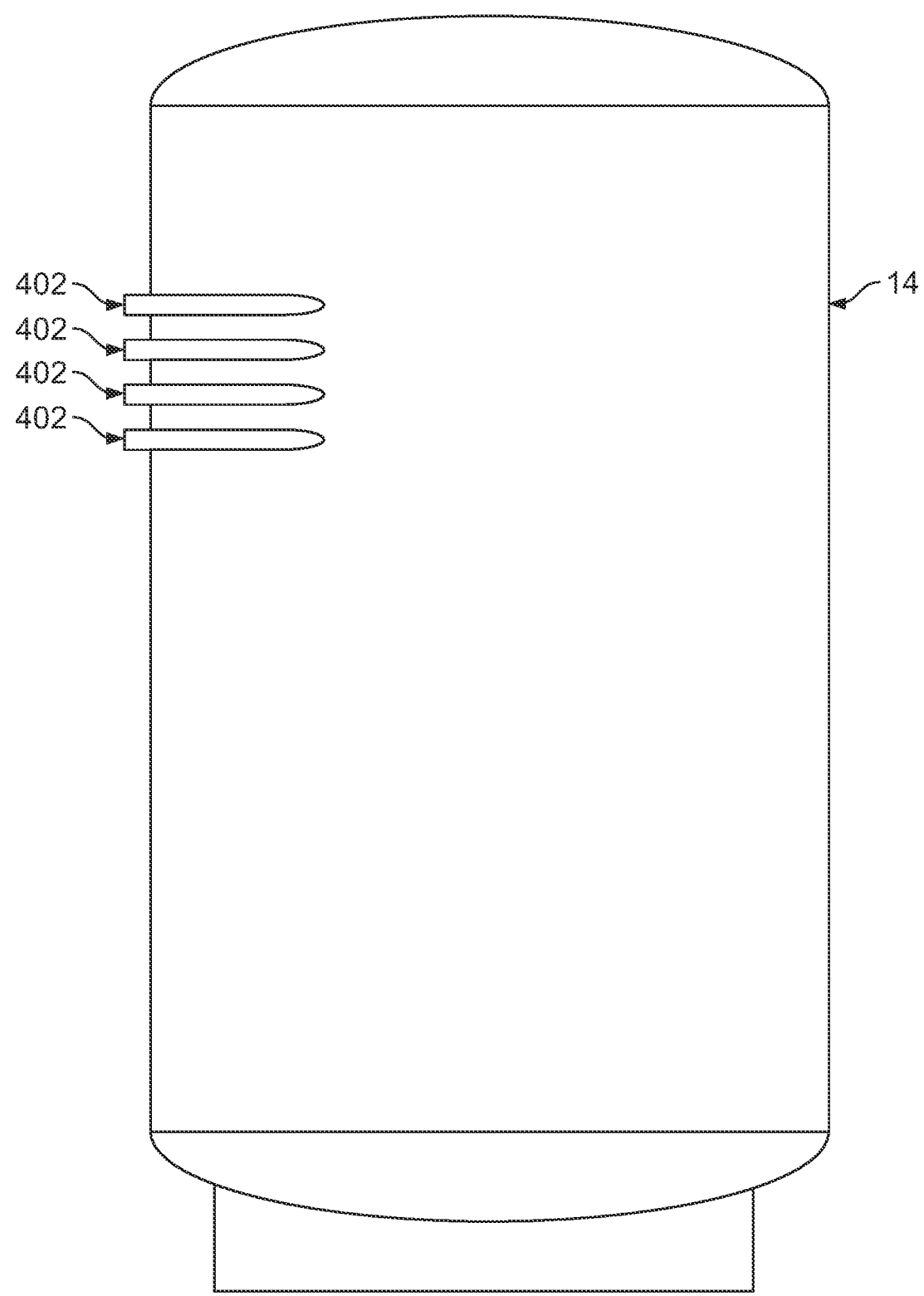
FIG. 4 is a side view of the intermediate storage container according to an embodiment of the present invention.
Figure 5:
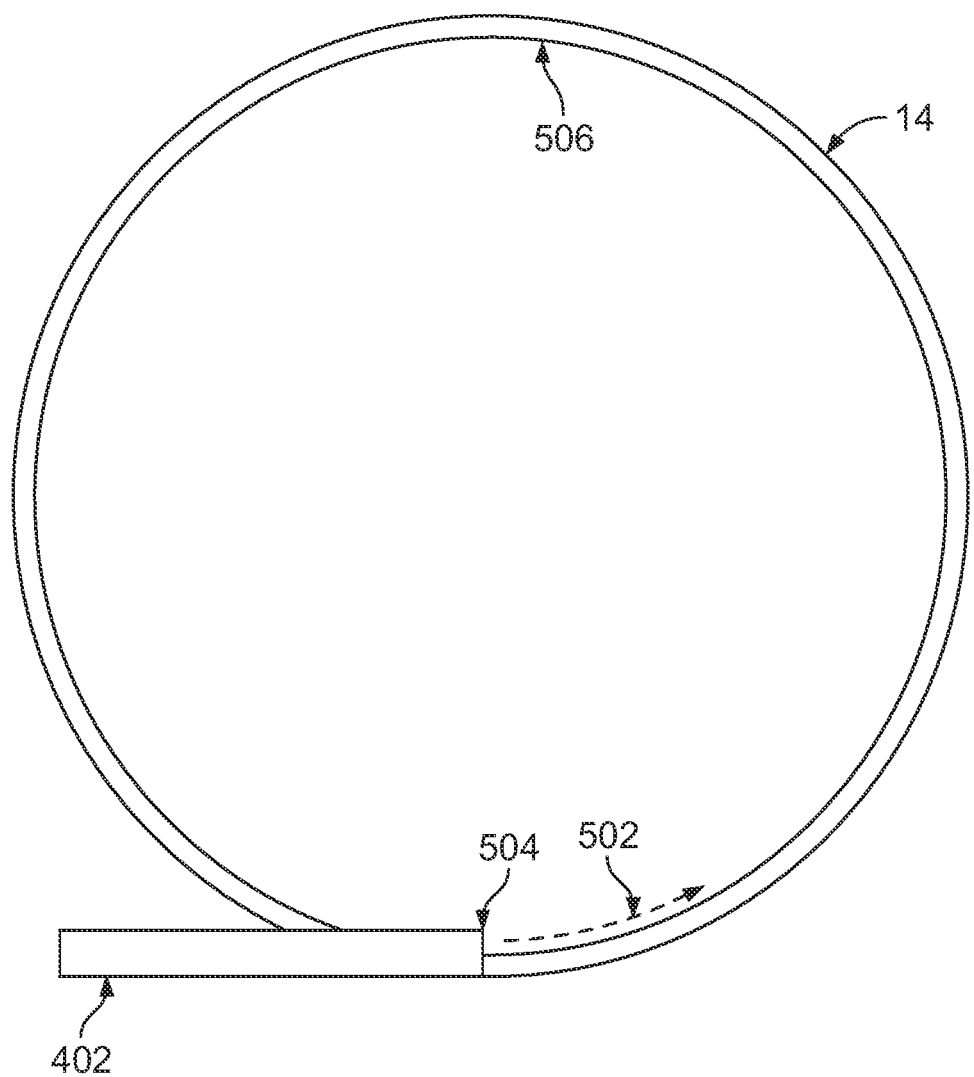
FIG. 5 depicts a cross-sectional top-view of the intermediate storage container according to an embodiment of the present invention.

In certain embodiments, as shown in FIG. 4, intermediate storage container 14 includes a plurality of inlets 402, one configured for each bay and the associated fluid extraction line. For clarity, only the inlets 402 are shown in intermediate storage container 14 and other associated valves and hoses as described herein are omitted. As shown, each bay has a single corresponding inlet 402 in intermediate storage container 14. Further shown in FIG. 5, each inlet 402 also contains an oil outlet 504. This oil outlet 504 is arranged to allow the oil, as it enters the intermediate storage container 14 to flow in direction 502, tangential to and in contact with the interior wall 506 of the intermediate storage container 14. This contact, combined with the flow direction 502 agitates the oil as it flows into intermediate storage container 14, degasses the oil, which has become aerated through the extraction process. Additionally, the negative pressure applied to the intermediate storage container 14 also aids this degassing process. Once degassed, the waste oil is better suited to be transported to final storage container 54. In certain preferred embodiments, the intermediate storage container 14 utilizes magnets to capture any metallic debris in the waste oil. These magnets can be external to the intermediate storage container 14 or integrated in the construction.

Final storage container 54 is typically located outside the service facility some distance away. It will generally have a fluid capacity much greater than that of intermediate storage container 14. Controller 16 will also monitor the fluid level in final storage container 54, and when level sensor/transmitter 53 of final storage container 54 communicates to controller 16 that a quantity of oil sufficient to fill final storage container 54 to a predetermined "full" set point, such as for example, 75% of the container volume, has been received in the final storage container, the controller will alert the operator that the final storage container is full and shut down fluid extraction system 10.

The invention thus provides a fluid extraction system that can remove crankcase oil (or another vehicle fluid) from multiple service bays either sequentially or simultaneously. Preferably, system 10 operates to extract fluid at a rate of 3-4 gallons/minute from each service bay, lifting the oil more than twenty feet and conveying it to an intermediate storage container 75 feet away from the service bays. When the intermediate storage container has reached its predetermined "full" set point, the system will automatically transfer the oil from the intermediate storage container to a final storage container located outside the service facility and as far as 150 feet away.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A fluid extraction system for internal combustion powered vehicles, the system comprising:
   a pump configured to provide a negative pressure to the system allowing for expedited removal of vehicle fluids;
   a negative-pressure-capable intermediate storage container configured to receive vehicle fluids having a fluid connection with the pump, a level sensor, a pressure sensor, and an atmospheric valve;
   a final storage container operatively connected to the intermediate storage container placed at a certain distance away from the intermediate storage container capable of containing more vehicle fluid than the intermediate storage container and having a level sensor and an atmospheric valve;
   a plurality of fluid extraction lines each having a first end, a second end, a valve, and a liquid presence detector, wherein the first end is attached to the intermediate storage container, the second end engages with the vehicle, the valve is located adjacent the second end, and the liquid presence detector is located between the valve and the first end;
   a plurality of quick-disconnect couplers for providing a fluid-tight connection between the vehicle and the system, each coupler having a first component and a second component, each first component being operatively connected to a fluid reservoir on the vehicle and each second component being affixed to the second end of each of the plurality of fluid extraction lines;

a plurality of operating switches, each operating switch configured to operate the system in a service bay; and a controller configured to turn on the pump thereby providing a negative pressure to the intermediate storage container, receive an input from one of the plurality of operating switches indicating an operator has fluidly coupled one of the plurality of fluid extraction lines via the quick-disconnect couplers, upon receipt of the input, provide a signal to open the valve of the specific fluid extraction hose in operation thereby applying negative pressure to the fluid reservoir of the vehicle and rapidly moving the fluid from the reservoir to the intermediate storage container, monitor the presence of fluid in the specific fluid extraction line based on signals from the liquid presence detector and upon a signal of no fluid remaining in the line, closing the valve in the fluid extraction line, and monitor a fluid level in the intermediate storage container and the final storage container, wherein as the fluid level in the intermediate storage container reaches an undesirable level, as indicated by the level sensor of the intermediate storage container, the controller opens the atmospheric valve of the intermediate storage container to relieve the system of negative pressure, opens a valve in a connection line between the intermediate storage container and the final storage container, and transports the waste fluid via positive pressure to the final storage container where the level is monitored by the level sensor of the final storage container and as the level becomes undesirable, the controller shuts down the system until the level is lowered.

* * * * *